(12) United States Patent
Kume et al.

(10) Patent No.: US 12,453,846 B2
(45) Date of Patent: Oct. 28, 2025

(54) STOPCOCK WITH INDEXING MECHANISM PROVIDING FEEDBACK OF HUB POSITION

(71) Applicant: Boston Scientific Scimed, Inc., Maple Grove, MN (US)

(72) Inventors: Stewart Kume, Sunnyvale, CA (US); Lorraine Martinez, Sunnyvale, CA (US); Adam Wigginton, Sunnyvale, CA (US)

(73) Assignee: Boston Scientific Scimed, Inc., Maple Grove, MN (US)

( * ) Notice: Subject to any disclaimer, the term of this patent is extended or adjusted under 35 U.S.C. 154(b) by 0 days.

(21) Appl. No.: 18/713,438

(22) PCT Filed: Nov. 22, 2022

(86) PCT No.: PCT/US2022/050714
§ 371 (c)(1),
(2) Date: May 24, 2024

(87) PCT Pub. No.: WO2023/096898
PCT Pub. Date: Jun. 1, 2023

(65) Prior Publication Data
US 2025/0041582 A1    Feb. 6, 2025

Related U.S. Application Data

(60) Provisional application No. 63/283,055, filed on Nov. 24, 2021.

(51) Int. Cl.
*A61M 39/22* (2006.01)

(52) U.S. Cl.
CPC ....... *A61M 39/22* (2013.01); *A61M 2039/229* (2013.01); *A61M 2205/581* (2013.01); *A61M 2205/582* (2013.01)

(58) Field of Classification Search
CPC ............ A61M 39/22; A61M 2039/229; A61M 2205/581; A61M 2205/582
See application file for complete search history.

(56) References Cited

U.S. PATENT DOCUMENTS

| 3,788,602 A | 1/1974 | Kitzie |
| 3,957,082 A | 5/1976 | Fuson et al. |

(Continued)

FOREIGN PATENT DOCUMENTS

| DE | 20005691 U1 | 6/2000 |
| WO | WO-2022/266195 A1 | 12/2022 |

(Continued)

OTHER PUBLICATIONS

U.S. Appl. No. 14/227,585, filed Mar. 27, 2014, US 2014-0296769.

(Continued)

*Primary Examiner* — Patrick C Williams
(74) *Attorney, Agent, or Firm* — Seager, Tufte & Wickhem, LLP

(57) ABSTRACT

A medical stopcock having a body with a central, cylindrical hub surrounding an axis and a plurality of ports extending radially outward from the hub; a rotatable hub having a housing, a manifold shaft, and an arm; and an indexing feature comprising at least one spring-loaded element configured to provide engagement with at least a portion of the rotatable hub and an upper surface of at least one of the plurality of ports of the body. Related systems, devices, and methods are provided.

13 Claims, 16 Drawing Sheets

(56) References Cited

U.S. PATENT DOCUMENTS

| | | | |
|---|---|---|---|
| 4,197,876 | A | 4/1980 | Lobdell |
| 4,207,923 | A | 6/1980 | Giurtino |
| 4,821,996 | A | 4/1989 | Bellotti et al. |
| 5,019,054 | A | 5/1991 | Clement et al. |
| 5,129,891 | A | 7/1992 | Young |
| 5,203,769 | A | 4/1993 | Clement et al. |
| 5,443,453 | A | 8/1995 | Walker et al. |
| 5,713,850 | A | 2/1998 | Heilmann et al. |
| 5,832,959 | A * | 11/1998 | Szymczakowski .......... A61M 39/223 251/297 |
| 6,017,318 | A | 1/2000 | Gauthier et al. |
| 6,196,266 | B1 * | 3/2001 | Breda ............... F16K 11/0853 137/454.6 |
| 6,413,235 | B1 | 7/2002 | Parodi |
| 6,423,032 | B2 | 7/2002 | Parodi |
| 6,536,742 | B2 | 3/2003 | Lotz et al. |
| 6,595,953 | B1 | 7/2003 | Coppi et al. |
| 6,708,948 | B2 | 3/2004 | Nosel |
| 6,837,881 | B1 | 1/2005 | Barbut |
| 6,880,808 | B2 | 4/2005 | McPeak et al. |
| 7,083,594 | B2 | 8/2006 | Coppi |
| 7,232,428 | B1 | 6/2007 | Inukai et al. |
| 7,503,902 | B2 | 3/2009 | Jensen et al. |
| 7,771,383 | B2 | 8/2010 | Truitt et al. |
| 7,794,675 | B2 | 9/2010 | Lynn |
| 7,803,133 | B2 | 9/2010 | Lee |
| 7,824,364 | B2 | 11/2010 | Kitani et al. |
| 7,849,877 | B2 * | 12/2010 | Tan ............... F16K 11/076 251/285 |
| 7,914,495 | B2 | 3/2011 | Amor |
| 7,963,951 | B2 | 6/2011 | Kitani et al. |
| 7,975,721 | B2 | 7/2011 | Hiebert |
| 8,075,520 | B2 | 12/2011 | Reznik |
| 8,206,376 | B2 | 6/2012 | Barron et al. |
| 8,361,408 | B2 | 1/2013 | Lynn |
| 8,584,701 | B2 | 11/2013 | Duncan |
| 8,852,168 | B2 | 10/2014 | Barron et al. |
| 8,911,397 | B2 | 12/2014 | O'Donnell et al. |
| 9,044,586 | B2 | 6/2015 | Egley et al. |
| 9,061,129 | B2 | 6/2015 | Lauer |
| 9,089,681 | B2 | 7/2015 | Ueda et al. |
| 9,162,042 | B2 | 10/2015 | Thompson et al. |
| 9,212,762 | B2 | 12/2015 | Duncan |
| 9,241,699 | B1 | 1/2016 | Kume et al. |
| 9,500,287 | B2 | 11/2016 | Duncan |
| 9,566,385 | B2 | 2/2017 | Franks |
| 9,669,207 | B2 | 6/2017 | Ueda |
| 9,737,660 | B2 | 8/2017 | Robinson et al. |
| 9,764,126 | B2 | 9/2017 | Tornblom |
| 9,907,945 | B2 | 3/2018 | Laufer |
| 9,913,971 | B2 | 3/2018 | Ogawa et al. |
| 9,931,447 | B2 | 4/2018 | Layser et al. |
| 9,995,405 | B2 | 6/2018 | Duncan |
| 10,137,293 | B2 | 11/2018 | Hamidian Jahromi et al. |
| 10,143,580 | B2 | 12/2018 | Batterson et al. |
| 10,215,294 | B2 | 2/2019 | Ferrer Beltran |
| 10,449,351 | B2 | 10/2019 | Tornblom |
| 10,471,248 | B2 | 11/2019 | Kunschak et al. |
| 10,561,832 | B2 | 2/2020 | Allard |
| 10,729,856 | B1 | 8/2020 | Nock et al. |
| 10,773,069 | B2 | 9/2020 | Laufer et al. |
| 10,874,589 | B2 | 12/2020 | Lewkonya et al. |
| 10,952,593 | B2 | 3/2021 | Knight et al. |
| 11,065,383 | B2 | 7/2021 | Ueda |
| 2001/0044598 | A1 | 11/2001 | Parodi |
| 2005/0154344 | A1 | 7/2005 | Chang |
| 2005/0154349 | A1 | 7/2005 | Renz et al. |
| 2006/0106338 | A1 | 5/2006 | Chang |
| 2009/0024072 | A1 | 1/2009 | Criado et al. |
| 2009/0198172 | A1 | 8/2009 | Garrison et al. |
| 2009/0254166 | A1 | 10/2009 | Chou et al. |
| 2010/0042118 | A1 | 2/2010 | Garrison et al. |
| 2010/0185216 | A1 | 7/2010 | Garrison et al. |
| 2010/0191106 | A1 * | 7/2010 | Koyama ............ A61M 39/223 600/431 |
| 2010/0204684 | A1 | 8/2010 | Garrison et al. |
| 2010/0217276 | A1 | 8/2010 | Garrison et al. |
| 2010/0228269 | A1 | 9/2010 | Garrison et al. |
| 2010/0319796 | A1 | 12/2010 | Whitaker |
| 2011/0004147 | A1 | 1/2011 | Renati et al. |
| 2011/0034986 | A1 | 2/2011 | Chou et al. |
| 2011/0213459 | A1 | 9/2011 | Garrison et al. |
| 2013/0197621 | A1 | 8/2013 | Ryan et al. |
| 2014/0046346 | A1 | 2/2014 | Hentges et al. |
| 2014/0135661 | A1 | 5/2014 | Garrison et al. |
| 2014/0296769 | A1 | 10/2014 | Hyde et al. |
| 2014/0296868 | A1 | 10/2014 | Garrison et al. |
| 2015/0080942 | A1 | 3/2015 | Garrison et al. |
| 2015/0174368 | A1 | 6/2015 | Garrison et al. |
| 2015/0327843 | A1 | 11/2015 | Garrison |
| 2016/0242764 | A1 | 8/2016 | Garrison et al. |
| 2016/0296690 | A1 | 10/2016 | Kume et al. |
| 2016/0317288 | A1 | 11/2016 | Rogers et al. |
| 2017/0281922 | A1 | 10/2017 | Baid |
| 2017/0296798 | A1 | 10/2017 | Kume et al. |
| 2018/0235789 | A1 | 8/2018 | Wallace et al. |
| 2019/0125512 | A1 | 5/2019 | MacDonald et al. |
| 2020/0330724 | A1 * | 10/2020 | Mikhail ............... A61M 25/04 |
| 2020/0397472 | A1 | 12/2020 | MacDonald et al. |
| 2021/0145453 | A1 | 5/2021 | Kume |
| 2021/0228859 | A1 | 7/2021 | Picot et al. |
| 2022/0047267 | A1 | 2/2022 | Johnston et al. |
| 2022/0193321 | A1 | 6/2022 | Kume et al. |
| 2022/0378565 | A1 | 12/2022 | Kume et al. |
| 2022/0401111 | A1 | 12/2022 | Rogers et al. |
| 2023/0067426 | A1 | 3/2023 | Steele et al. |
| 2023/0101242 | A1 | 3/2023 | Steele et al. |
| 2023/0165696 | A1 | 6/2023 | Kume et al. |

FOREIGN PATENT DOCUMENTS

| | | |
|---|---|---|
| WO | WO-2023/107926 A1 | 6/2023 |
| WO | WO-2023/183476 A1 | 9/2023 |
| WO | WO-2023/183808 A2 | 9/2023 |
| WO | WO-2023/230277 A1 | 11/2023 |
| WO | WO-2023/244643 A1 | 12/2023 |
| WO | WO-2024/015336 A1 | 1/2024 |
| WO | WO-2024/020142 A1 | 1/2024 |
| WO | WO-2024/064153 A1 | 3/2024 |
| WO | WO-2024/072944 A1 | 4/2024 |

OTHER PUBLICATIONS

U.S. Appl. No. 15/049,637, filed Feb. 22, 2016, US 2016-0242764.
U.S. Appl. No. 15/399,638, filed Jan. 5, 2017, US 2017-0209260.
U.S. Appl. No. 16/530,783, filed Aug. 2, 2019, US 2020-0054871.
U.S. Appl. No. 16/906,457, filed Jun. 19, 2020, US 2020-0397472.
U.S. Appl. No. 16/951,767, filed Nov. 18, 2020, US 2021-0145453.
U.S. Appl. No. 16/999,634, filed Aug. 21, 2020, US 2020-0375728.
U.S. Appl. No. 16/999,640, filed Aug. 21, 2020, US 2020-0375729.
U.S. Appl. No. 17/000,004, filed Aug. 21, 2020, US 2020-0390438.
U.S. Appl. No. 17/149,450, filed Jan. 14, 2021, US 2021-0298929.
U.S. Appl. No. 17/179,746, filed Feb. 19, 2021, US 2021-0244522.
U.S. Appl. No. 17/206,665, filed Mar. 19, 2021, US 2021-0307945.
U.S. Appl. No. 17/237,911, filed Apr. 22, 2021, US 2021-0236790.
U.S. Appl. No. 17/345,502, filed Jun. 11, 2021, US 2021-0299343.
U.S. Appl. No. 17/345,544, filed Jun. 11, 2021, US 2021-0299425.
U.S. Appl. No. 17/398,969, filed Aug. 10, 2021, US 2022-0047267.
U.S. Appl. No. 17/406,822, filed Aug. 19, 2021, US 2022-0040502.
U.S. Appl. No. 17/555,127, filed Dec. 17, 2021, US 2022-0193321.
U.S. Appl. No. 17/684,745, filed Mar. 2, 2022, US 2023-0045964.
U.S. Appl. No. 17/749,423, filed May 20, 2022, US 2023-0001161.
U.S. Appl. No. 17/749,454, filed May 20, 2022, US 2023-0097442.
U.S. Appl. No. 17/773,200, filed Apr. 29, 2022, US 2022-0401111.
U.S. Appl. No. 17/773,206, filed Apr. 29, 2022, US 2022-0378565.
U.S. Appl. No. 17/899,279, filed Aug. 30, 2022, US 2023-0067426.
U.S. Appl. No. 17/951,727, filed Sep. 23, 2022, US 2023-0101242.
U.S. Appl. No. 18/071,323, filed Nov. 29, 2022, US 2023-0165696.
U.S. Appl. No. 18/301,838, filed Apr. 17, 2023, US 2024-0091424.

(56) References Cited

OTHER PUBLICATIONS

U.S. Appl. No. 18/448,483, filed Aug. 11, 2023, US 2024-0149028.
PCT/US2023/064772, Mar. 21, 2023, WO 2023/183808.
PCT/US2023/016058, Mar. 23, 2023, WO 2023/183476.
PCT/US2023/023603, May 25, 2023, WO 2023/230277.
PCT/US2023/025266, Jun. 14, 2023, WO 2023/244643.
PCT/US2023/027339, Jul. 11, 2023, WO 2024/015336.
PCT/US2023/028248, Jul. 21, 2023, WO 2024/020142.
PCT/US2023/033165, Sep. 19, 2023, WO 2024/064153.
PCT/US2023/033949, Sep. 28, 2023, WO 2024/072944.
Connecta Plus Stopcock—500/cs (n.d.). Tiger Medical. Retrieved Jul. 10, 2024, from https://tigermedical.com/products/connecta-plus-stopcock-bd394910 1 page.
Discofix® 3-way Stopcock (n.d.) B. Braun SE. Retrieved Jul. 10, 2024, from https://catalogs.bbraun.com/en-01/p/PRID00000591/discofix-3-way-stopcock?bomUsage=documents 1 page.
Henry et al. (1999) "Carotid stenting with cerebral protection: First Clinical Experience Using the PercuSurge GuardWire System" J. Endovasc. Surg. 6:321-331.

* cited by examiner

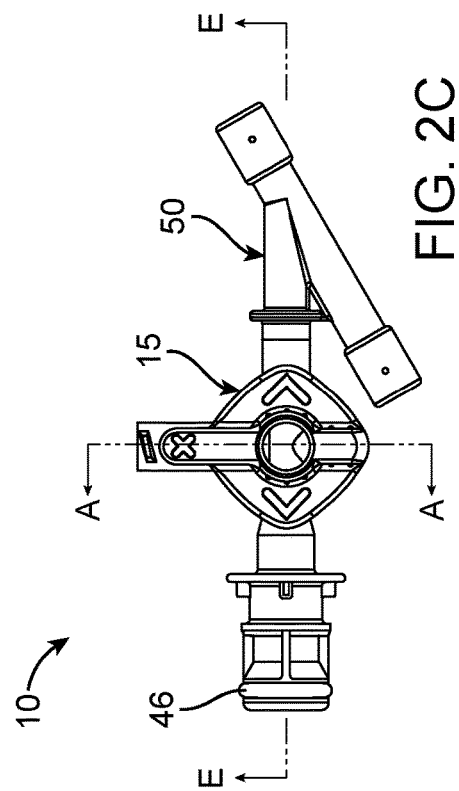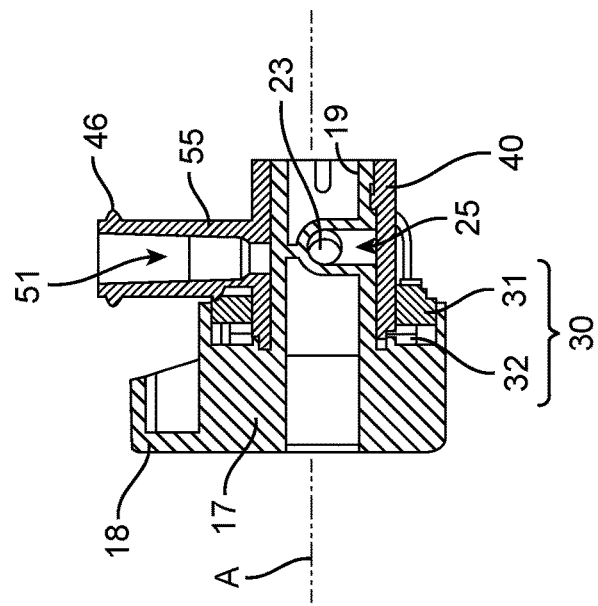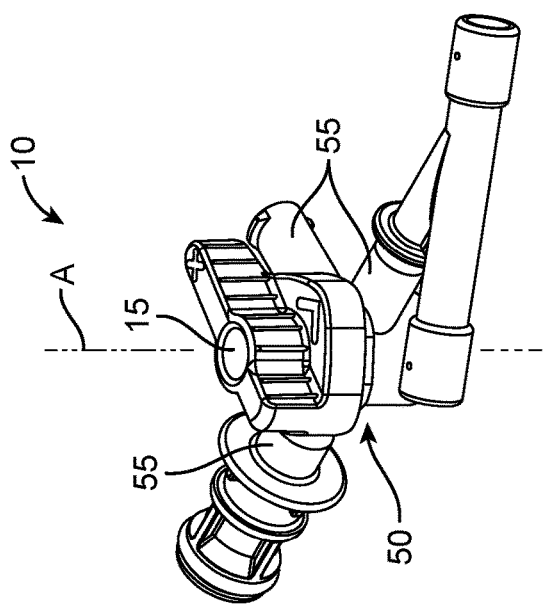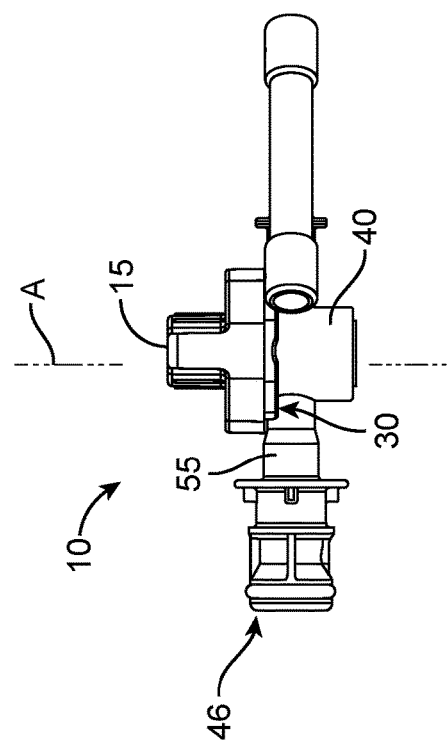

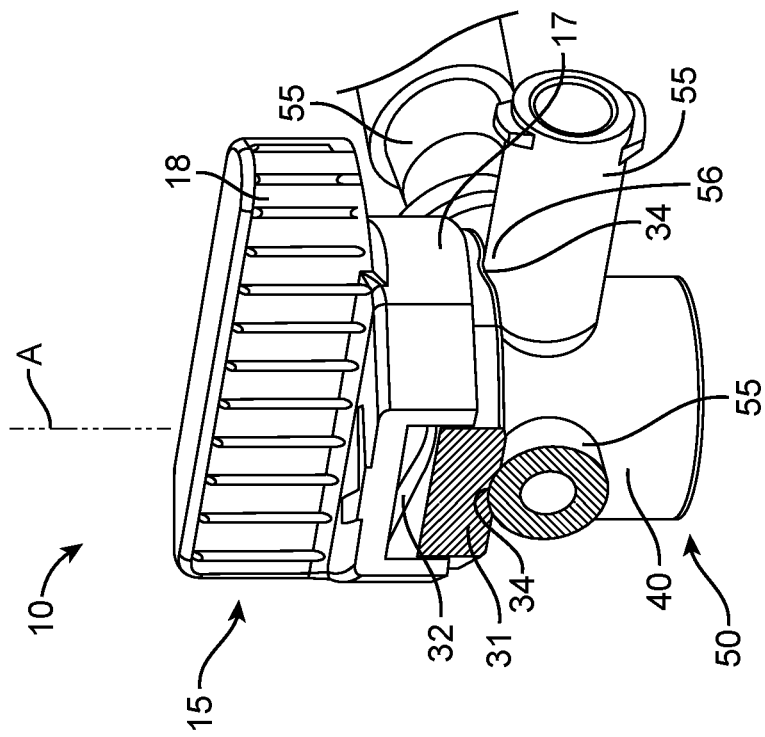
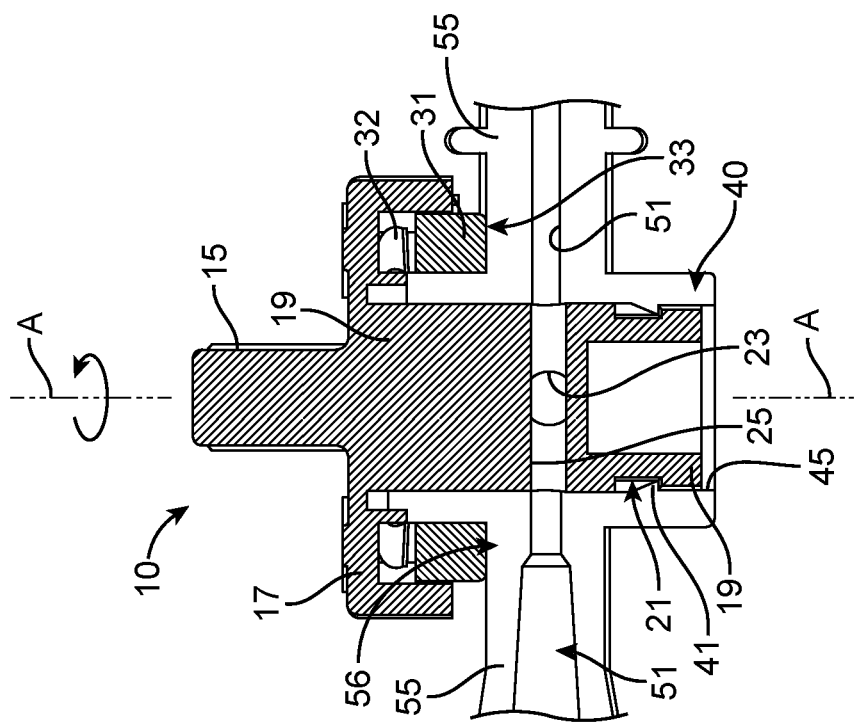
FIG. 2F
FIG. 2E

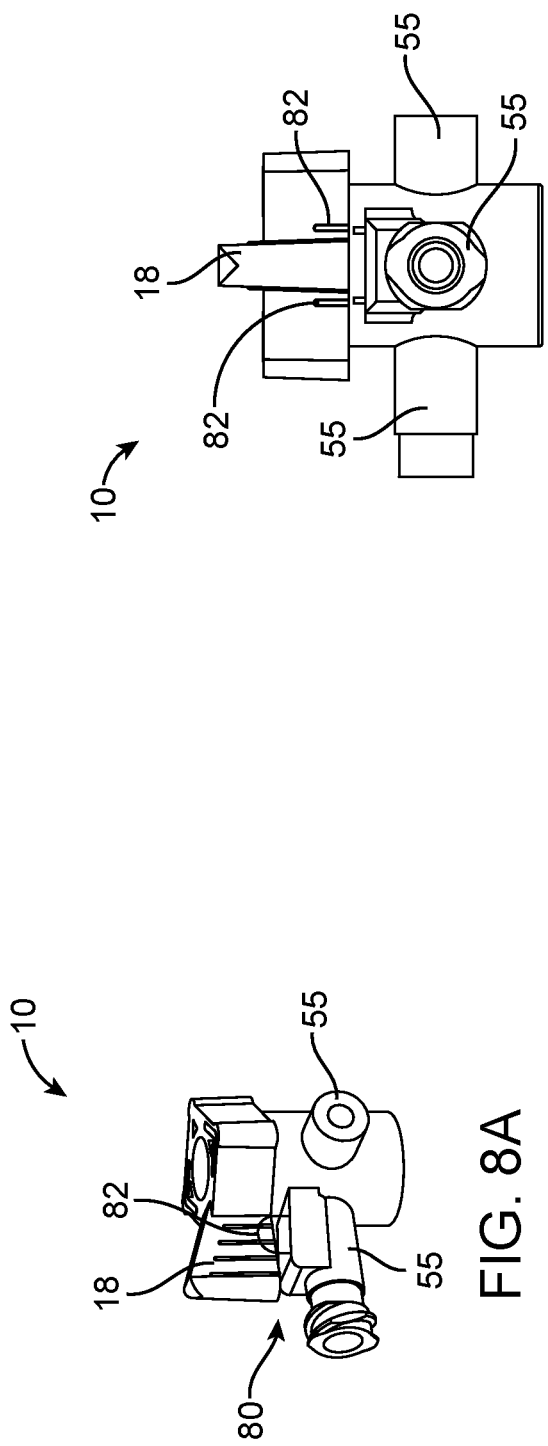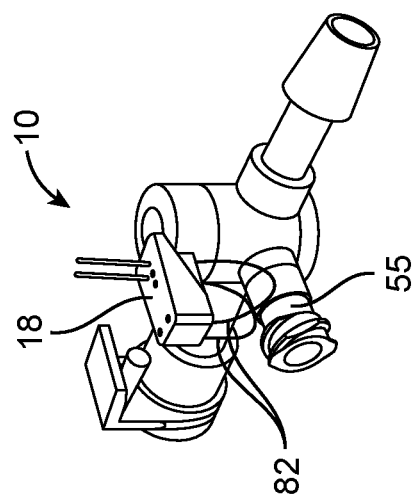

STOPCOCK WITH INDEXING MECHANISM PROVIDING FEEDBACK OF HUB POSITION

CROSS-REFERENCE TO RELATED APPLICATIONS

This application is a national stage filing under 35 U.S.C. § 371 of International Application No. PCT/US2022/050714 filed Nov. 22, 2022, which claims the benefit of priority under 35 U.S.C. § 119 (e) to U.S. Provisional Patent Application Ser. No. 63/283,055, filed Nov. 24, 2021. The contents are hereby incorporated by reference herein in their entireties.

BACKGROUND

The present disclosure relates to stopcocks for the control of fluid flow between multiple ports. More particularly, described are stopcocks with an indexing mechanism that provides feedback of hub position.

Stopcock style valves are commonly used medical devices to control the flow of a liquid or gas. The device typically includes a body or housing, a central rotating hub, and two or more ports for attachment of tubing or other devices. The rotating hub has one or more through-holes that by rotating the hub to different positions provides a pathway for fluid flow from one port to another. The hub typically includes an extended arm that provides the user with visual indication of the rotational orientation of the hub. The extended arm most often "points to" the closed port and allows flow between the other ports. The hub typically rotates smoothly with the application of modest torque. In order to ensure the hub is rotated to the correct position, a user typically visually confirms the hub arm is pointing toward the appropriate port. The user must take care to properly align the hub arm toward one of the ports in order to ensure that fluid communication to the "closed" port is completely blocked and the fluid pathway between the "open" ports is fully open. If the hub arm is not properly oriented unintentional flow through the "closed" port can occur or the fluid flow through the "open" ports is reduced from maximum. Misalignment of the hub arm can cause a decrease in fluid flow that impacts the effectiveness of a medical procedure, such as transcarotid arterial revascularization procedures. Decreased flow within the extracorporeal blood circuit can reduce the embolic neuroprotection achieved. A deviation of even 10-15 degrees from the optimum alignment may have a significant effect on the flow achieved through the extracorporeal blood circuit.

Accordingly, a need exists for stopcocks that alert a user to optimum full flow and full closed positions.

SUMMARY

In an aspect, provided is a medical stopcock having a body with a central, cylindrical hub surrounding an axis and a plurality of ports extending radially outward from the hub and a rotatable hub having a housing, a manifold shaft, and an arm. The arm projects from an upper surface of the housing and the manifold shaft extends from a lower surface of the housing. The manifold shaft is sized to be received within the cylindrical hub of the body so as to align coaxially with the cylindrical hub in a rotatable arrangement. The medical stopcock has an indexing feature having at least one spring-loaded element configured to provide engagement with at least a portion of the rotatable hub and an upper surface of at least one of the plurality of ports of the body. The engagement can provide a tactile and/or audible confirmation of alignment between the portion of the rotatable hub and the upper surface of the at least one port to allow full fluid flow through the at least one port or full closure of the at least one port. The spring-loaded element can be coupled to the rotatable hub so as to turn around the axis when torque is applied to the arm. The spring-loaded element can be coupled to the rotatable hub so that movement along the axis relative to the rotatable hub is permitted and rotation around the axis relative to the rotatable hub is prevented. The spring-loaded element can include a lifter plate positioned within at least a region of the housing and at least one spring positioned above the lifter plate. A lower surface of the lifter plate can have at least one detent. The at least one detent can include a concave shape complementary to a convex shape of the upper surface of the at least one port. The at least one spring can be a wave spring, a wire spring, a leaf spring, a cantilever spring, a coil spring, or a hoop spring.

The lower surface of the lifter plate can have a plurality of detents. The plurality of detents can be arranged on the lifter plate to match an arrangement of the plurality of ports on the body. The plurality of ports can include at least three ports spaced about 90 degrees from an adjacent port. The spring-loaded element can include a ball positioned within a spring housing containing a spring. The spring housing can be positioned at a location of the at least one port, and the arm can have a detent in a lower surface such that the ball is received within the detent when the arm and the upper surface of the at least one port are aligned. The spring housing can be positioned on the arm. The upper surface of the at least one port can include a detent such that the ball is received within the detent when the arm and the upper surface of the at least one port are aligned.

In some variations, one or more of the following can optionally be included in any feasible combination in the above methods, apparatus, devices, and systems. More details are set forth in the accompanying drawings and the description below. Other features and advantages will be apparent from the description and drawings.

BRIEF DESCRIPTION OF THE DRAWINGS

These and other aspects will now be described in detail with references to the following drawings. Generally speaking the figures are exemplary and are not to scale in absolute terms or comparatively but are intended to be illustrative. Relative placement of features and elements is modified for the purpose of illustrative clarity.

FIG. 2A is a perspective view of a stopcock according to an implementation;

FIG. 2B is a side view of the stopcock of FIG. 2A;

FIG. 2C is a top view of the stopcock of FIG. 2A;

FIG. 2D is a cross-sectional view of the stopcock of FIG. 2C taken along arrow A-A;

FIG. 2E is a cross-sectional view of the stopcock of FIG. 2C taken along arrow E-E;

FIG. 2F is a perspective view of the stopcock of FIG. 2A;

FIGS. 8A-8B are perspective and side views, respectively, of an interrelated implementation of a stopcock having an indexing feature incorporating a spring retainer assembly;

FIG. 8C is a perspective view of an interrelated implementation of a stopcock having an indexing feature incorporating a spring retainer assembly;

DETAILED DESCRIPTION

Provided here are stopcocks having an indexing feature that provides the user with clear feedback as to whether or not the hub arm is in the ideal alignment for maximum flow through the open port.

Figure 1:
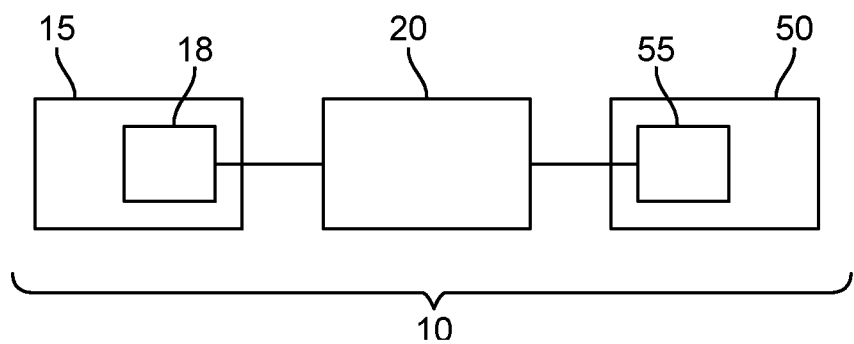
FIG. 1 is a box diagram showing a stopcock having an indexing feature.

FIG. 1 is a box diagram showing a medical stopcock 10 having a hub 15 coupled to a quick connect body 50 so as to be rotated around an axis to open or close flow through the various ports 55 of the body 50. The stopcock 10 can include an indexing feature 20 configured to provide feedback to a user of the rotational position of the hub 15 relative to the body 50 to ensure the position of the hub 15 is fully open and optimized for flow or fully closed for no flow. For example, the indexing feature 20 can provide distinctive visual, tactile and/or audible feedback of the port position by "clicking" or "snapping" into place when rotated to the various operational positions (e.g., 0, 90, 180 degrees around the body 50). The configuration of the indexing feature 20 can vary, but generally incorporates a spring-loaded element configured to provide engagement between a portion of the rotational hub 15, such as an arm 18 on the hub, and a portion of at least one of the ports 55, such as an upper surface of the port 55.

FIGS. 2A-2D and also FIGS. 2E-2J illustrate an implementation of the stopcock 10 of FIG. 1 having the hub 15 coupled to the body 50. The hub 15 of the stopcock 10 can include an arm 18 projecting above an upper surface of the housing 17 and a manifold shaft 19 that extends away from the upper housing 17 axially along a central axis A of the hub 15. The body 50 can include a plurality of ports 55 extending radially from a central, cylindrical hub 40. The ports 55 provide inlets or outlets through the stopcock 10 to which other structures can be attached and detached at couplings 46 on an outer surface of an end region of each port 55 to facilitate secure removable attachment of a structure to the stopcock 10.

The hub 40 can define a hollow core 45 extending axially through the hub 40 and aligned with the central axis A. The hollow core 45 of the hub 40 is sized to receive the manifold shaft 19 of the stopcock 10 such that the manifold shaft 19 and the core 45 are coaxially aligned with central axis A. The connection between the hub 40 and the manifold shaft 19 can be sufficiently tight in tolerance to resist leakage or can incorporate a seal element, such as an O-ring or similar sealing element. The outer surface of the manifold shaft 19 and the inner surface of the core 45 can be in snug arrangement relative to one another so that movements between them are minimized except for rotation of the manifold shaft 19 around axis A within the core 45. The outer surface of the manifold shaft 19 can incorporate a quick connect surface feature, such as a detent slot 21 configured to engage with a projection of the inner surface of the core 45, such as detent rib 41 so that once the manifold shaft 19 is inserted within the core 45 in a first direction along axis A, inadvertent removal of the manifold shaft 19 in an opposite direction along axis A is substantially prevented during normal use.

Figure 2H:
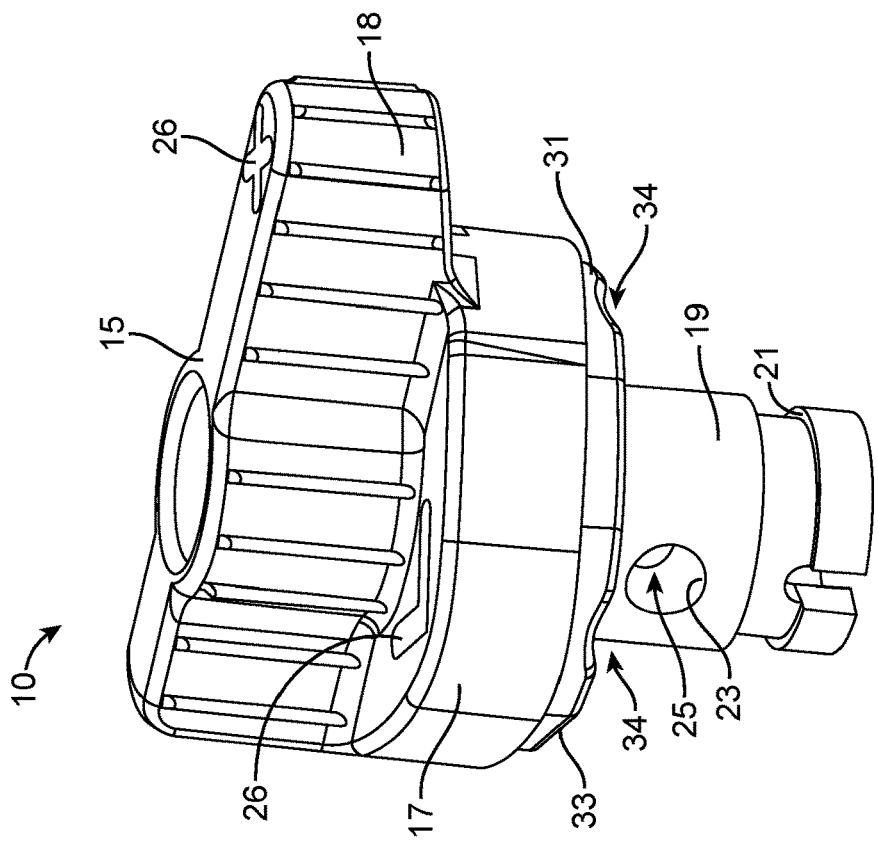
FIG. 2H is a perspective view of the stopcock of FIG. 2A without the body.
Figure 2G:
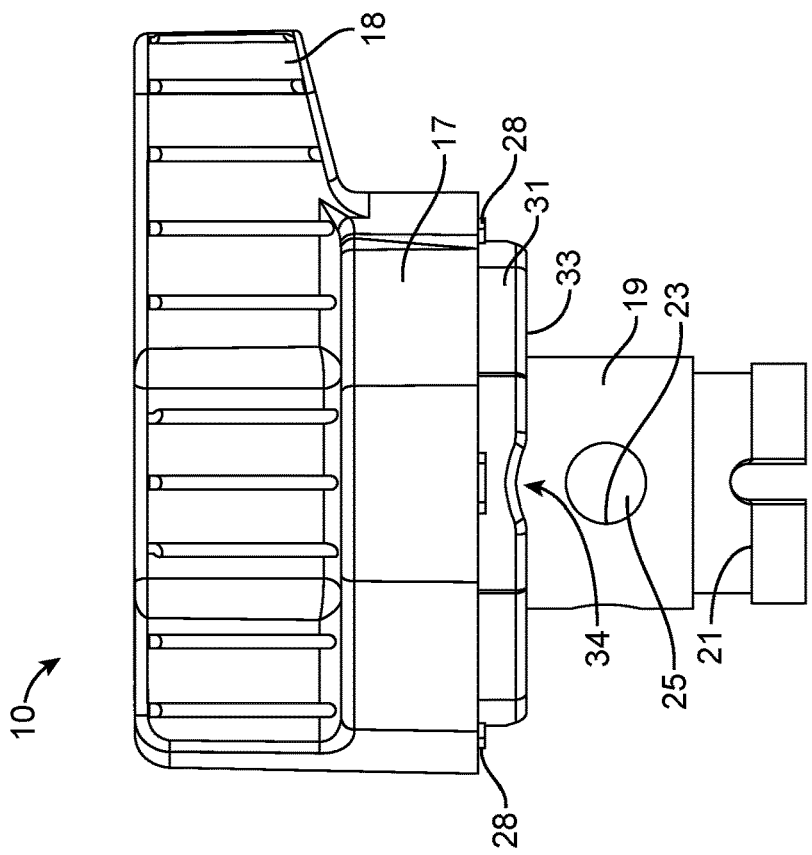
FIG. 2G is a side view of the stopcock of FIG. 2A without the body.
Figure 2J:
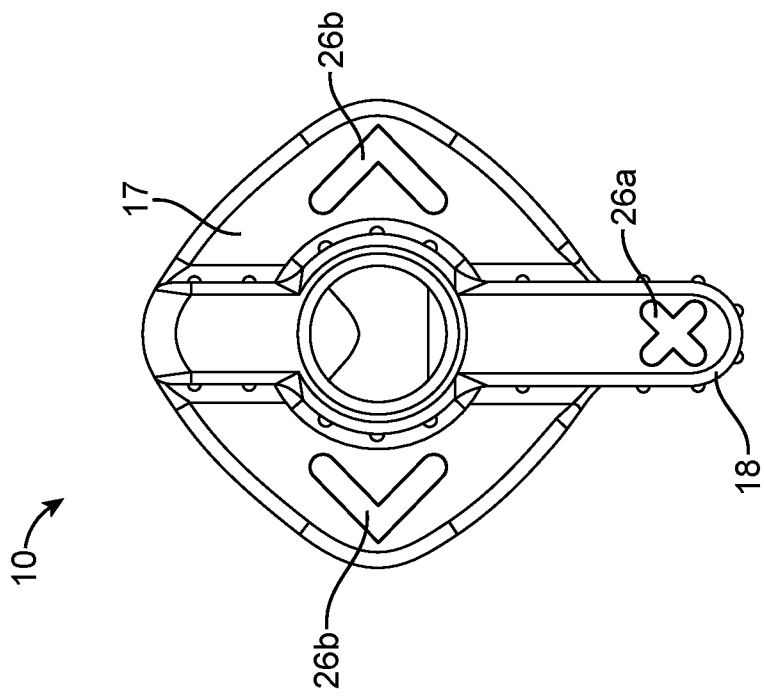
FIG. 2J is a top view of the stopcock of FIG. 2A without the body.
Figure 2I:
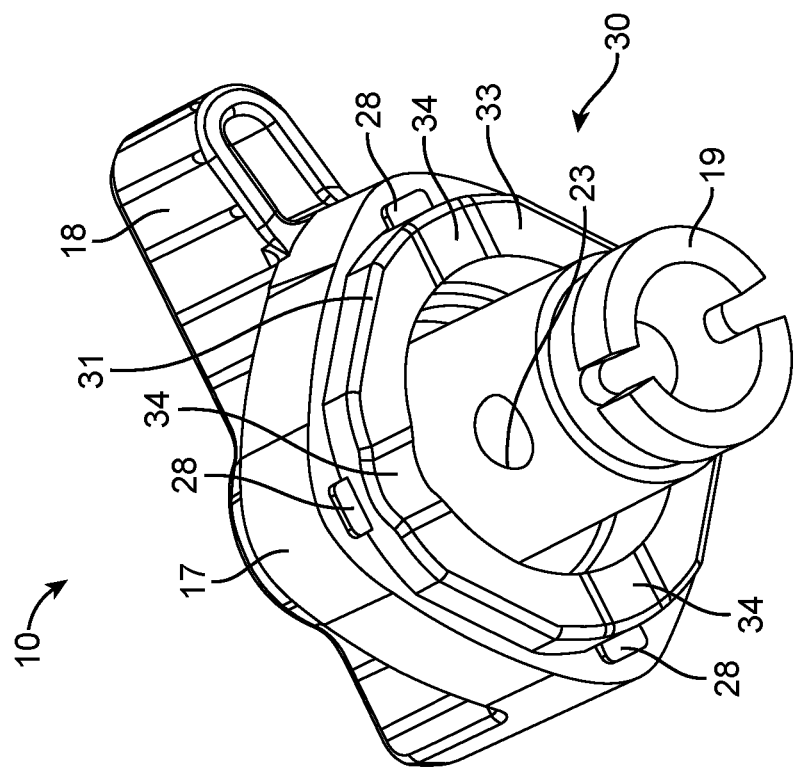
FIG. 2I is another perspective view of the stopcock of FIG. 2A without the body.

Again with respect to FIGS. 2A-2F and also FIGS. 2G-2I, the manifold shaft 19 includes openings 23 into pathways 25 that extend radially away from the central axis A where the openings 23 intersect with an outer surface of the manifold shaft 19. The openings 23 are configured to be in fluid communication with each other and with the ports 55 of the body 50. The ports 55 define pathways 51 through to the hollow core 45 of the hub 40 that can be placed into alignment with the openings 23 of the manifold shaft 19 to open the ports 55 to allow fluid flow through the stopcock 10 from the ports 55 aligned with the openings 23. The openings 23 into the pathways 25 of the manifold shaft 19 are designed to correspond in number and position to the number and position of the ports 55 of the body 50. In some implementations, the body 50 includes 3 ports 55 that are positioned 90 degrees from one another (e.g., 0, 90, and 180 degrees around hub 40). The manifold shaft 19 in this configuration would also include 3 openings 23 positioned 90 degrees from one another. The arrangement can include fewer or more than 3.

Still with respect to FIGS. 2A-2I, the arm 18 of the hub 15 can be a rigid structure having any of a variety of shapes suitable for gripping by the fingers of a user to apply torque to the stopcock 10 for rotation of the hub 15 relative to the body 50 between the operational states. The arm 18 can be oriented so it extends radially relative to the central axis A in a position that is spaced so that the position of the arm 18 defines an "off" orientation that causes the ports 55 adjacent the arm 18 to be closed. Other orientations are considered as well. The upper surface of the housing 17 and/or the arm 18 of the hub 15 can include one or more visible indicia or markers 26 to provide visual guidance and information regarding the open state and closed states of the various ports 55. In some implementations, a first marker 26 is positioned on a surface of the arm 18 (see FIGS. 2C and 2J) so as to indicate the flow in that direction is closed. The marker 26 can be an "x" or other symbol that provides information to the user that flow is off in the direction indicated by the arm 18. One or more markers 26 can be positioned on a surface of the housing 17 to indicate the flow in that direction is open. Thus, when the marker 26 on the arm 18 is indicating a particular port is closed, the marker 26 on the housing 17 can indicate the flow in that direction is open. The marker 26 on the housing 17 thus, can be unique from the marker 26 on the arm 18, such as an arrow, open circle, or another symbol to indicate an open port. FIG. 2J shows the arm 18 pointing in a first direction and having a marker 26a that is an "x" indicating flow through a port 55 aligned with the arm 18 is closed. Two additional markers 26b are on the upper surface of the housing 17 and are arranged 90 degrees away from the first mark 26a on the arm 18. These markers 26b are shown as arrows indicating flow through the pathway in the directions indicated is open. Any of a variety of specific marks, symbols, letters, numbers, etc. can be used to provide information to a user about the status of a port with the stopcock 10 is rotated to a particular position.

As described above, the stopcock 10 can include an indexing feature 20 configured to provide feedback to a user of the rotational position of the hub 15 relative to the body 50 to ensure the position of the hub 15 is optimized for flow or fully closed for no flow. The indexing feature can have any of a variety of configurations.

FIGS. 2A-2I illustrate an implementation of an indexing feature that incorporates a spring-biased lifter plate assembly 30. The spring-biased lifter plate assembly 30 can include a lifter plate 31 positioned within a region of the upper housing 17 of the hub 15 and one or more springs 32. The lifter plate 31 can have an annular disc shape. An outer diameter of the plate 31 can be sized to abut against an inner-facing surface of the housing 17 and an inner diameter of the plate 31 is sized and positioned to encircle an upper portion of the central hub 40 (see FIG. 2E). The plate 31 can be coupled to the hub 15 of the stopcock 10 so that it rotates together with the hub 15 around axis A. The plate 31 and the housing 17 can interface via interlacing features so that relative rotation between them is prevented, but axial motion of the plate 31 relative to the housing 17 along axis A is allowed.

Figure 3:
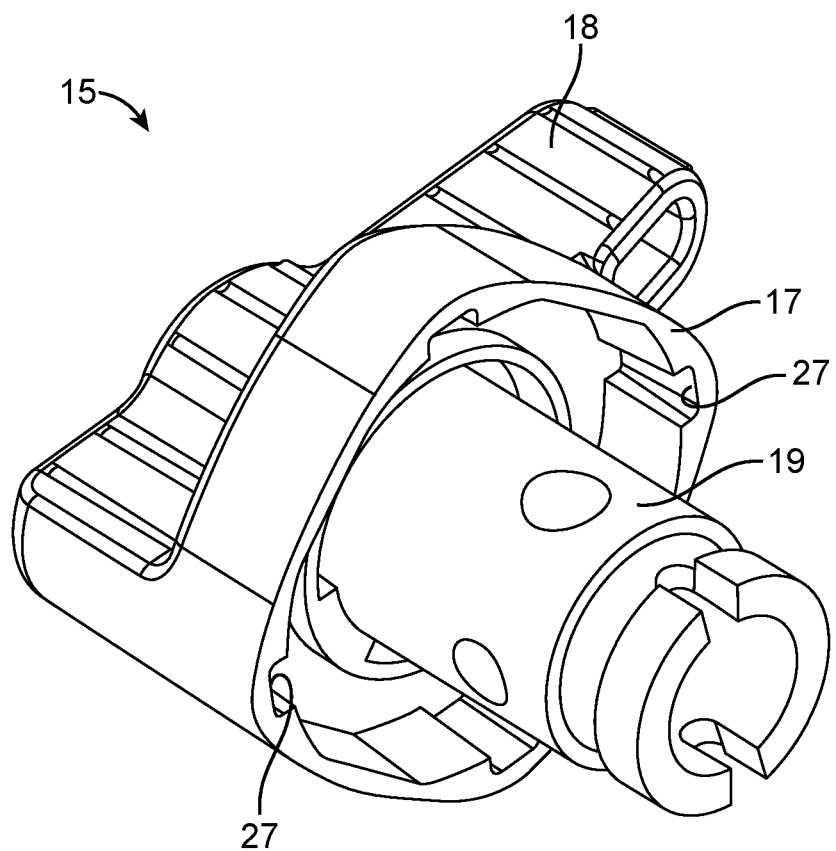
FIG. 3 is a perspective view of the rotating hub of the stopcock of FIG. 2A.

FIG. 3 is a lower end view of the hub 15 of the stopcock 10 illustrating inner surfaces of the housing 17. The housing 17 together with the manifold shaft 19 define a space within which the plate 31 resides. The inner surface of the housing 17 can incorporate one or more channels 27. The lifter plate 31 can include corresponding features 28 on the outer perimeter that are sized and shaped to be received within the channels 27 of the housing 17 (see FIGS. 4A-4C). This engagement between the features 28 and channels 27 prevents relative rotation between the housing 17 and the lifter plate 31, but allows axial travel of the lifter plate 31 inside the housing 17 along the axis A.

Figure 4F:
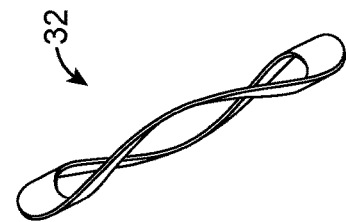
FIGS. 4D-4F are top, perspective and side views, respectively, of a wave spring of an indexing feature.
Figure 4E:
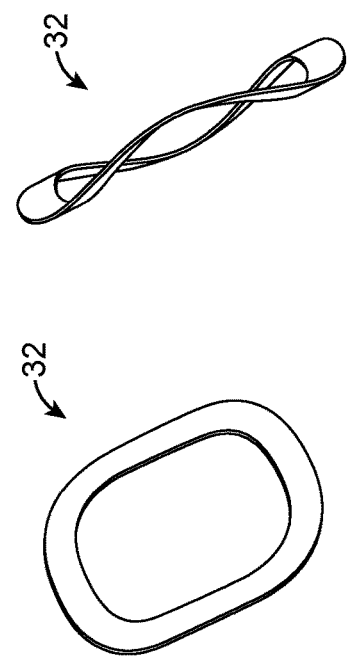
Figure 4D:
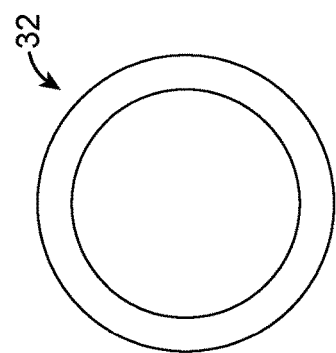
Figure 5:
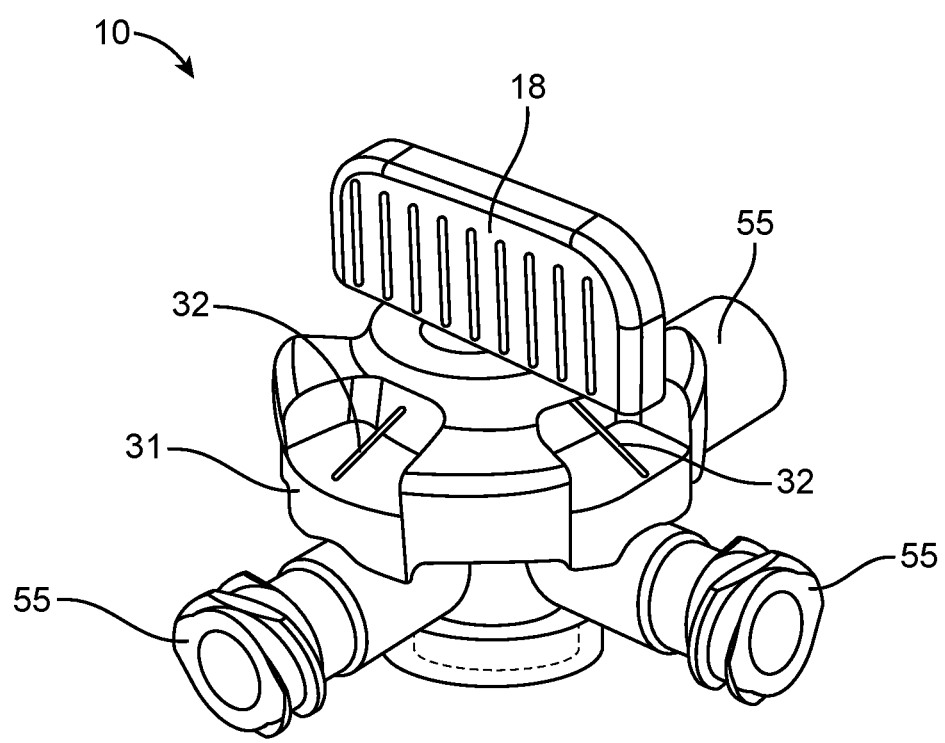
FIG. 5 is a perspective view of an interrelated implementation of a stopcock having an indexing feature.
Figure 6:
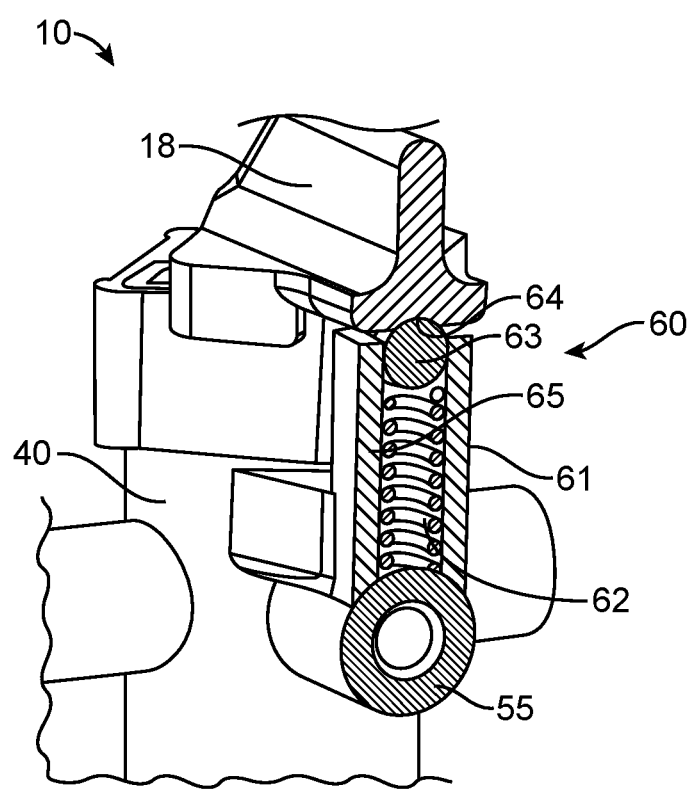
FIG. 6 is a cross-sectional partial view of an interrelated implementation of a stopcock having an indexing feature incorporating a ball plunger assembly.
Figure 9B:
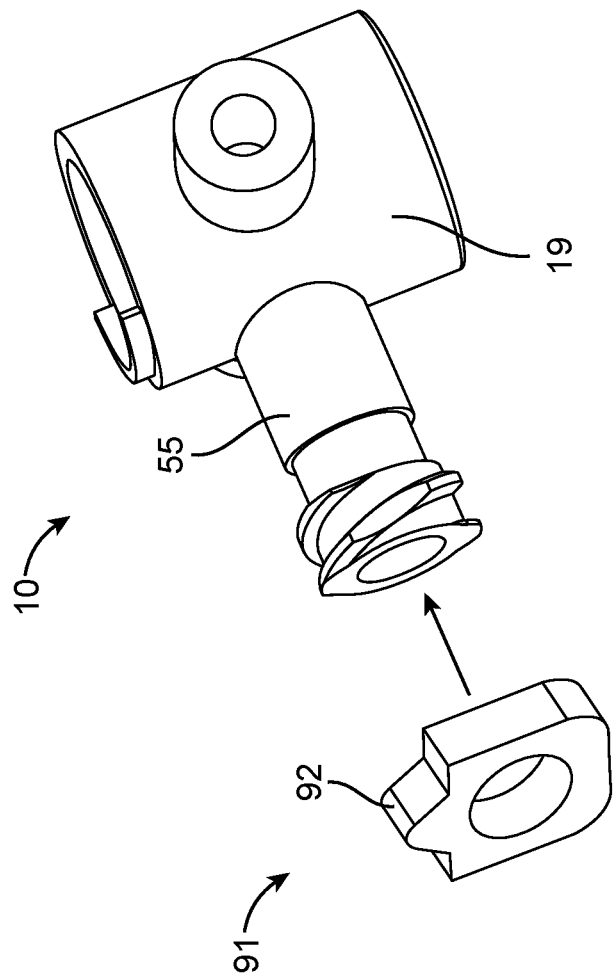
FIG. 9B is an exploded, perspective view of another implementation of a stopcock having an indexing feature incorporating a saddle retainer assembly.
Figure 9A:
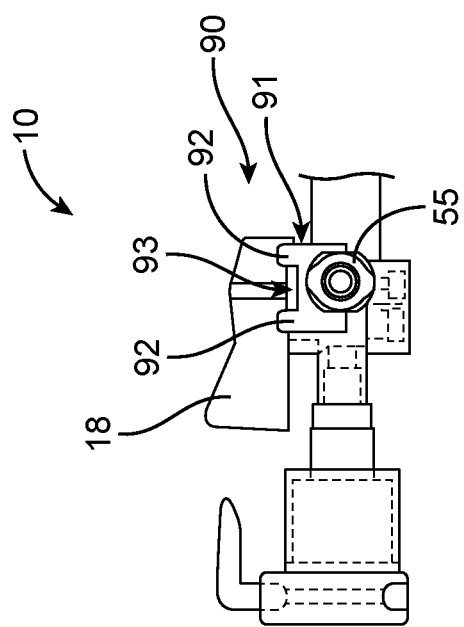
FIG. 9A is a side view of an interrelated implementation of a stopcock having an indexing feature incorporating a saddle retainer assembly.

The lifter plate 31 is biased towards the ports 55 with one or more springs 32 of the lifter plate assembly 30. The springs 32 can be positioned above the plate 31 so as to urge the plate 31 downward relative to the housing 17. The configuration of the spring 32 can vary. Regardless the structure and configuration, the spring(s) 32 can urge the plate 31 against the ports 55 with a moderate amount of force. FIGS. 4D-4F show the spring 32 of the lifter plate assembly 30 is a wave spring. FIG. 5 shows a similar lifter plate assembly 30 having a plurality of Nitinol wire springs (leaf springs or cantilever springs) positioned against an upper surface of the lifter plate 31. FIG. 6 shows a coil spring. FIGS. 8A-8C shows an embodiment with hoop springs. The spring 32 can also be a living hinge or other flexures a shown in FIGS. 10-11 or elastomeric or springy materials, such as shown in FIG. 9A.

Figure 4C:
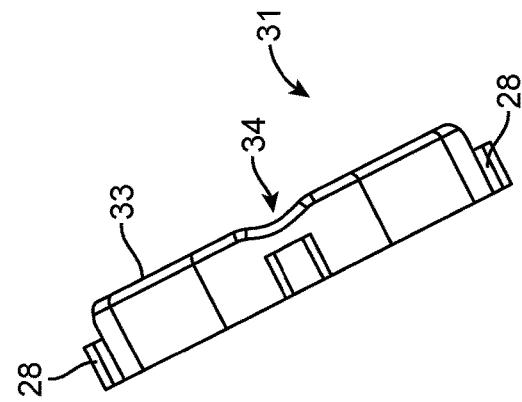
FIGS. 4A-4C are top, perspective and side views, respectively, of a lifter plate of an indexing feature.
Figure 4B:
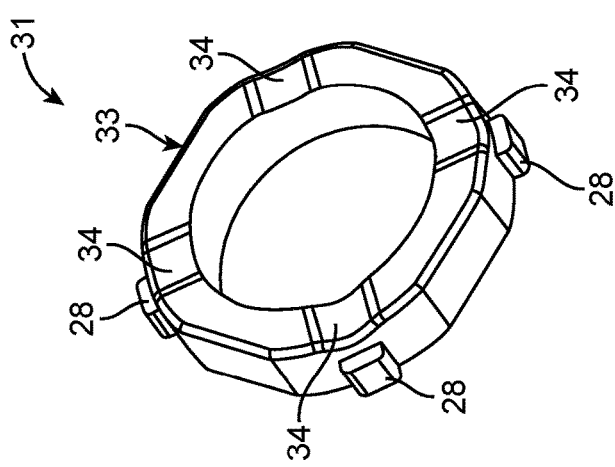
Figure 4A:
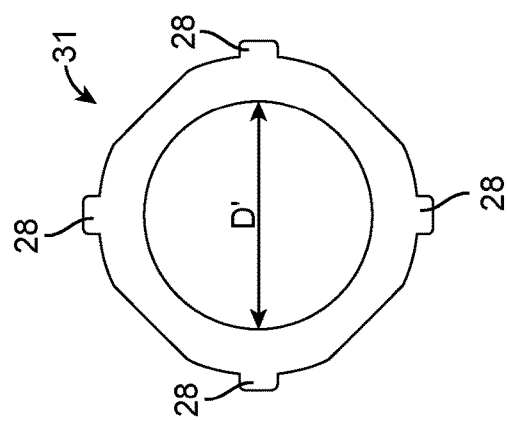

FIGS. 2E-2I and also FIGS. 4B-4C show the lower surface 33 of the lifter plate 31 can incorporate a plurality of detents 34. The detents 34 have a concave shape corresponding to a convex shape of the an upper surface 56 of the ports 55 of the body 50 so that the detents 34 in the lower surface 33 of the plate 31 mate with the upper surface 56 of each port 55 upon rotation around the axis A. The position of the detents 34 on the plate 31 correspond to the position of each port 55. As the plate 31 of the indexing feature 20 rotates with the housing 17, the lower surface 33 of the plate 31 slides along the upper surface 56 of the port 55. When the stopcock 10 is turned around axis A into an intermediate position so that the detents 34 are near, but misaligned with the ports 55, the plate 31 is urged upward slightly along axis A by the ports 55 compressing the spring(s) 32 so that the plate 31 travels further inside the housing 17. When the stopcock 10 is turned further around axis A to align the detents 34 with the upper surface 56 of the ports 55, the plate 31 is urged downward by the spring 32 traveling along axis A against the upper surface 56. The convex shape of the ports 55 mates together with the concave shape of the detents 34 in the plate 31 providing a distinctive snap and feel of the stopcock 10 into alignment with the ports 55. The lower surface 33 of the plate 31 between the detents 34 can be relatively planar. The lower surface intermediate of the detents 34 can also be sloped or slightly convex so as to encourage the plate 31 to continue rotating until the upper surfaces 56 of the ports 55 are received within the detents 34. The shape of the detents 34 can vary, but substantially correspond to the shape of the ports 55 so as to mate with the ports 55. For example, the ports 55 can be generally cylindrical features projecting outward from the cylindrical hub 40. The detents 34, in turn, can be semi-cylindrical in geometry to match the cylindrical shape of the ports 55. The receipt of the ports 55 into the detents 34 provides a distinct confirmation to the user that can be tactile and/or auditory that the position of the stopcock 10 is aligned in an optimum position relative to the port 55.

The shape of the detents 34 relative to the ports 55 provides confirmation and confidence that the relative orientation is a desired orientation to achieve full fluid flow through the port 55 or shut off fluid flow through the port 55 completely. The shape can be selected to prevent inadvertent rotation of the stopcock, such as with a minor finger flick or knock not intended to torque the stopcock 10. The shape also allows for intentional rotation of the stopcock so that it can be readily turned by a user when rotation is desired without too much torque that requires, for example, more than a single hand. Thus, an increased amount of torque is needed to rotate the stopcock away from engagement between the detents 34 and the ports 55 to prevent unintentional misalignment of the stopcock 10, but not so much torque to be unfriendly for a user to rotate with a single hand. The number of detents 34 in the lower surface 33 of the plate 31 can vary depending on the number of ports 55 in the body 50. If the ports 55 are positioned at 90 degrees away from each other, the detents 34 can be positioned similarly on the lower surface 33 of the plate 31.

FIG. 6 illustrate an interrelated implementation of a stopcock 10 having an indexing feature that includes a spring-loaded ball plunger assembly 60. The stopcock 10 of FIG. 6 can incorporate each of the various components described above for the implementation of the stopcock 10 described with regard to FIGS. 2A-2J including the hub 15, body 50, arm 18 projecting relative to the housing 17, manifold shaft 19, and plurality of ports 55 extending radially from a central hub 40, sealing elements, markers, connectors, and various other features that might not be reiterated below. The indexing feature incorporating a ball plunger assembly 60 can include a housing 61 having an internal bore 65 aligned over each port 55. A ball 63 and a spring 62 can be positioned inside of the housing 61. The spring 62 urges the ball 63 upwards through the bore 65 of the housing 61 away from the upper surface of the port 55. The arm 18 can include a detent 64 in its lower surface that is sized and shaped to receive the convex upper surface of the ball 63. As the arm 18 rotates around the central axis A into alignment with one of the ports 55, the ball 63 can be received within the detent 64 urged upward by the spring 62. Thus, each port 55 can include a ball plunger assembly 60 that remains stationary such that when the arm 18 rotates around the hub 40 relative to the ports 55, the ball 63 goes in and out of engagement with the detent 64 of the arm 18. When arm 18 aligns with the port 55, the ball 63 snaps into the detent 64 under the force of the spring 62. When the arm 18 is rotated and misaligned relative to the port 55, the ball 63 is urged downward compressing the spring 62 further into the housing 61. The spring-loaded ball 63 automatically depresses to allow for adjustment of the stopcock 10 and then snaps back into the detent 64 upon alignment again. The ball plunger assembly 60 can also be positioned on the arm 18 (or another portion of the housing 17) so that a single assembly 60 rotates along with the arm 18 as the stopcock 10 is turned. In this scenario, the ball 63 can engage with a correspondingly-shaped detents 44 in the upper surface of each port 55. The ball plunger assembly 60 can rotate along with the arm 18. The ball 63 can be urged in a downward direction toward the ports 55 by the spring 62 within the housing 61. As the ball 63 enters the detent 64 in the upper surface of the port 55 a snap is felt and/or heard.

Figure 7B:
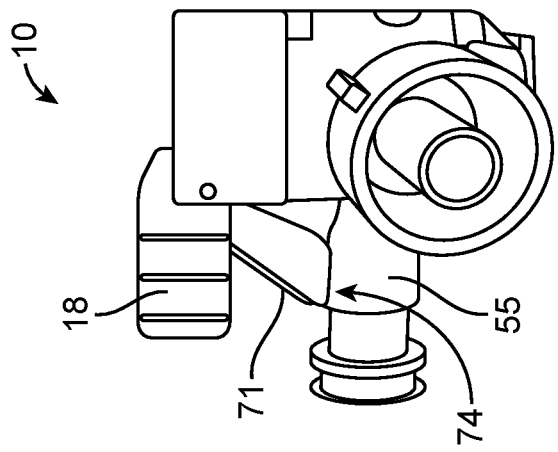
FIGS. 7A-7B are perspective and side views, respectively, of an interrelated implementation of a stopcock having an indexing feature incorporating a spring-loaded lever assembly.
Figure 7A:
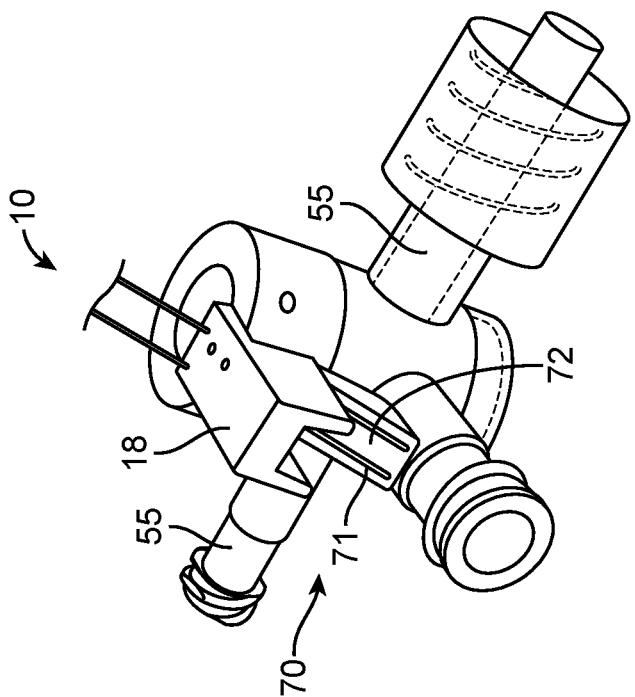

FIGS. 7A-7B illustrate an interrelated implementation of a stopcock 10 having an indexing feature that includes a spring-loaded lever assembly 70. The stopcock 10 of FIGS. 7A-7B can incorporate each of the various components described above for the implementation of the stopcock 10 described with regard to FIGS. 2A-2J including the hub 15, body 50, arm 18 projecting relative to the housing 17, manifold shaft 19, and plurality of ports 55 extending radially from a central hub 40, sealing elements, markers, connectors, and various other features that might not be reiterated below. The indexing feature incorporating a spring-loaded lever assembly 70 can have a lever 71 and a spring 72. The lever 71 can project downward below the arm 18 so that it rotates together with the arm 18. The lower surface of the lever 71 can have a pocket or detent 74 shaped and sized to receive an upper surface of each port 55. The spring 72 urges the lever 71 downward toward the upper surface of the port 55. As the arm 18 and the lever assembly 70 rotates around the central axis A so that the lever 71 comes into alignment with one of the ports 55, the upper surface of the port 55 is received within the detent 74 in the lower surface of the lever 71 and snaps into place under the force of the spring 72.

FIGS. 8A-8C illustrate an interrelated implementation of a stopcock 10 having an indexing feature that includes a spring retainer assembly 80. The stopcock 10 of FIGS. 8A-8C can incorporate each of the various components described above for the implementation of the stopcock 10 described with regard to FIGS. 2A-2J including the hub 15, body 50, arm 18 projecting relative to the housing 17, manifold shaft 19, and plurality of ports 55 extending radially from a central hub 40, sealing elements, markers, connectors, and various other features that might not be reiterated below. The indexing feature incorporating a spring retainer assembly 80 can have a pair of U-shaped spring hoops 82. The spring hoops 82 can project upward toward the arm 18 as shown in FIGS. 8A-8B or can project downward below the arm 18 towards the upper surface of the ports 55 as shown in FIG. 8C. The U-shaped portions of the spring hoops 82 can be angled away from one another defining a space therebetween so that the spring hoops 82 can straddle the arm 18 as in FIGS. 8A-8B or one of the ports 55 as in FIG. 8C upon being brought into alignment. In either implementation, the first of the two spring hoops 82 can flex as it comes into contact with the arm 18 or the port 55 during rotation toward the second of the spring hoops 82 to allow for further rotation. Once the relative rotation reaches an optimum position, the first spring hoop 82 can snap back into its resting position thereby capturing the arm 18 or the port 55 in the space between the first and second spring hoops 82. The hoops 82 can be formed of Nitinol or other material configured to retain its set shape that can undergo an amount of deformation.

FIG. 9A illustrates an interrelated implementation of a stopcock 10 having an indexing feature that includes a saddle retainer assembly 90. The stopcock 10 of FIG. 9A can incorporate each of the various components described above for the implementation of the stopcock 10 described with regard to FIGS. 2A-2J including the hub 15, body 50, arm 18 projecting relative to the housing 17, manifold shaft 19, and plurality of ports 55 extending radially from a central hub 40, sealing elements, markers, connectors, and various other features that might not be reiterated below. The indexing feature incorporating a saddle retainer assembly 90 can include a saddle-shaped retainer 91 affixed to an upper surface of one or more of the ports 55. The retainer 91 can have raised sides 92 on either side of a central saddle 93. At least the sides 92 of the retainer 91 can be made of an elastomeric material that deforms slightly upon coming into contact with the arm 18 allowing the arm to ride over the raised sides 92 of the retainer 91 and return to a resting shape to capture the arm 18 between the raised sides 92 once the arm sits within the saddle 93 of the retainer 91. The retainer 91 can also incorporate a single projection 92 as shown in FIG. 9B that interferes with the arm 18 as it rotates relative to the one or more ports 55. The retainer 91 can be an annular member have an inner diameter sized to receive an outer diameter of the port 55 such that the retainer 91 slides around the outside the port 55 and the projection 92 is positioned so as to project toward the upper region of the stopcock 10. The retainer 91, whether having two raised sides 92 forming a central saddle 93 as in FIG. 9A or a single projection 92 as in FIG. 9B, the interference provides tactile, audible, and/or visual feedback upon snapping into the detent feature using the height differential of the add-on saddle retainer 91 with the arm 18. As with other implementations described herein, the retainer assembly 90 can be positioned on the one or more ports 55 and remain stationary during rotation of the arm 18 or the retainer assembly 90 can be positioned on a lower surface of the arm 18 and rotate with the arm 18.

Figure 10:
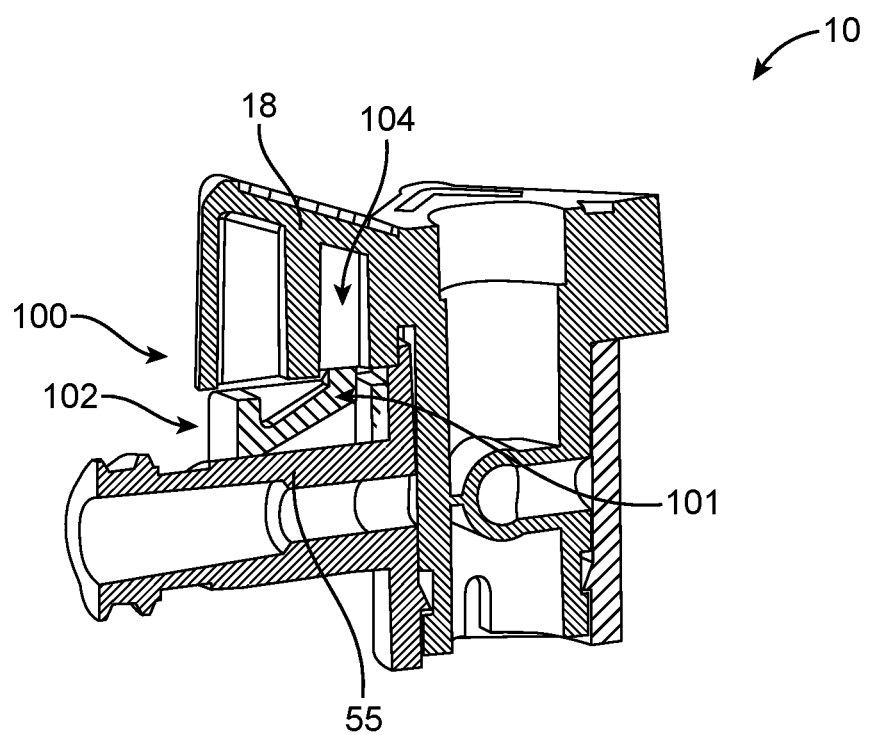
FIG. 10 is a cross-sectional view of an interrelated implementation of a stopcock having an indexing feature incorporating a catch assembly.

FIG. 10 illustrates an interrelated implementation of a stopcock 10 having an indexing feature that includes a catch assembly 100 The stopcock 10 of FIG. 10 can incorporate each of the various components described above for the implementation of the stopcock 10 described with regard to FIGS. 2A-2J including the hub 15, body 50, arm 18 projecting relative to the housing 17, manifold shaft 19, and plurality of ports 55 extending radially from a central hub 40, sealing elements, markers, connectors, and various other features that might not be reiterated below. The indexing feature incorporating a catch assembly 100 can have a movable lever 101. The assembly 100 can be affixed to an upper surface of one or more of the ports 55 so that the lever 101 engages with a lower surface of the arm 18 as it rotates relative to the ports 55. The lever 101 can flex up and down due to the presence of a living hinge 102. The lever 101 can deflect downward upon coming into contact with the arm 18 producing a modest amount of force. When the arm 18 rotates into alignment with the port 55, the lever 101 can flex back upward into a pocket or detent 104 in the lower surface of the arm 18. Multiple catch assemblies 100 can be incorporated at each port position to provide detent feedback. Alternatively, the catch assembly 100 can be coupled to the lower surface of the arm 18 and the detent 104 positioned in the upper surface of each port 55 providing a similar arrangement of the catch lever 101 nesting into a detent and providing tactile and/or auditory feedback of the relative position of the arm 18 to the ports 55.

Figure 11:
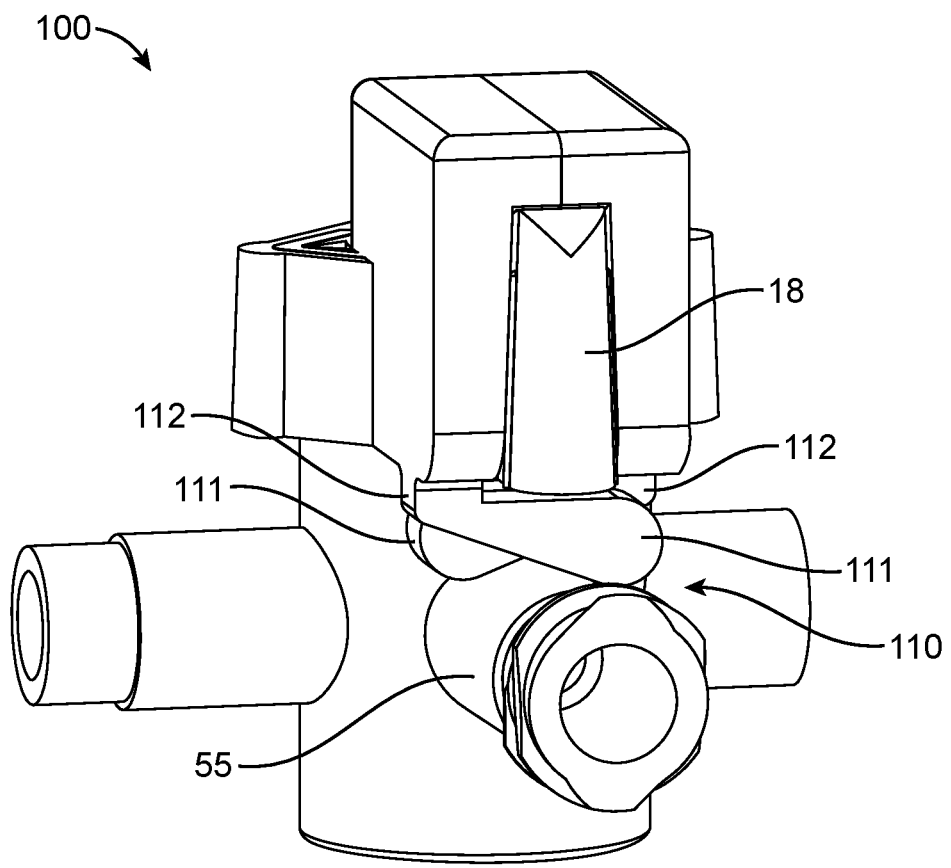
FIG. 11 is a side view of an interrelated implementation of a stopcock having an indexing feature incorporating a flexure.

FIG. 11 illustrates an interrelated implementation of a stopcock 10 having an indexing feature that includes one or more flexures 110. In an implementation, the indexing feature can include a pair of opposing flexures 110. The stopcock 10 of FIG. 11 can incorporate each of the various components described above for the implementation of the stopcock 10 described with regard to FIGS. 2A-2J including the hub 15, body 50, arm 18 projecting relative to the housing 17, manifold shaft 19, and plurality of ports 55 extending radially from a central hub 40, sealing elements, markers, connectors, and various other features that might not be reiterated below. Each flexure 110 projecting in opposite directions from one another can have a rounded leading end 111 projecting away from a living hinge 112. The leading ends 111 of the flexures can flex relative to the hinge 112 up and down depending on the position of the hub arm 18 relative to the ports 55. The flexures 110 have a natural position where the leadings ends 111 lie below the upper surface of the port 55 and a flexed position where the leading ends 111 are urged upward away from the natural position, for example, as the leading ends 111 slide over the upper surface of the port 55. The two opposing flexures 110 can crisscross over the upper surface of the port 55 when the hub arm 18 is in the 0, 90, or 180 degree position. Their leading ends 111 relax back into the natural position and lie below the upper surface of the port 55. The lower surfaces of the opposing flexures 110 create a recess or detent within which the convex upper surface of the port 55 can align and be received within once optimum relative rotation is achieved by the hub arm 18. An increase in torque to turn the hub arm 18 away from the optimum position provides the user with tactile and/or auditory feedback.

Each of the indexing features 20 described above can incorporate a spring-biased engagement between the arm 18 of the rotating hub 15 and the upper surface of the port 55 of the body 50. The indexing features 20 are external to the hubs 15, 40. The indexing feature 20 can also be incorporated within the hubs 15, 40.

Figure 12A:
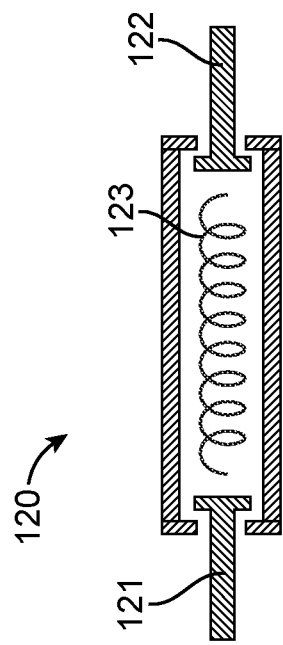
FIG. 12A is a top view of an interrelated implementation of a stopcock having an indexing feature incorporating a spring bar.
Figure 12C:
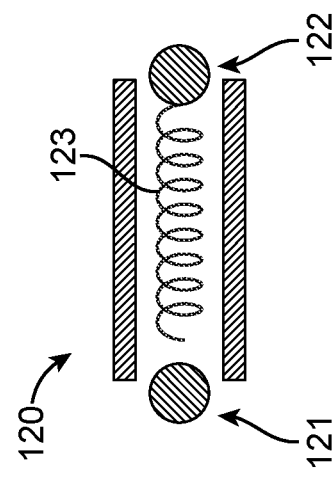
FIG. 12C is a cross-sectional schematic view of the spring bar of FIG. 12B.
Figure 12B:
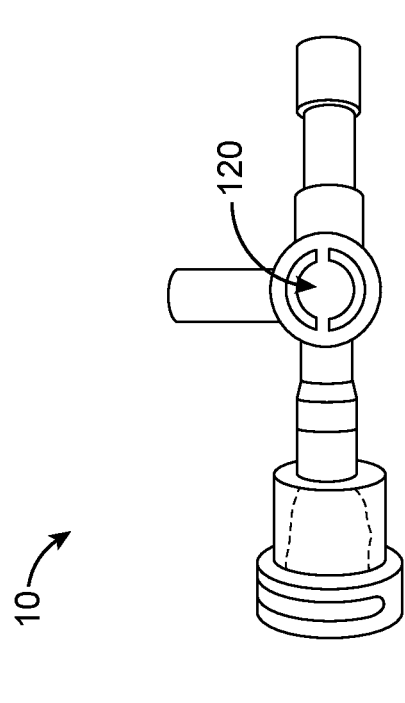
FIG. 12B is a view of the spring bar of FIG. 12A.
Figure 12D:
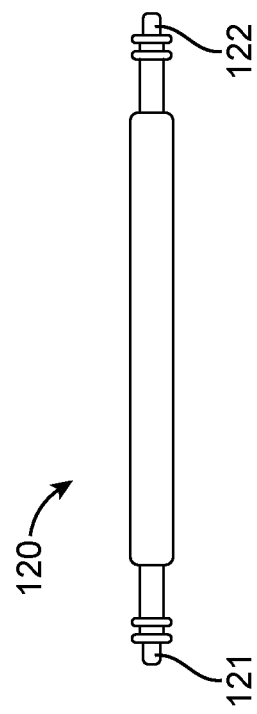
FIG. 12D is a cross-sectional schematic view of another implementation of a spring bar.

FIGS. 12A-12C illustrate an interrelated implementation of a stopcock 10 having an indexing feature that is internal to the hubs 15, 40. The stopcock 10 of FIGS. 12A-12C can incorporate each of the various components described above for the implementation of the stopcock 10 described with regard to FIGS. 2A-2J including the hub 15, body 50, arm 18 projecting relative to the housing 17, manifold shaft 19, and plurality of ports 55 extending radially from a central hub 40, sealing elements, markers, connectors, and various other features that might not be reiterated below. The indexing feature can include a double-sided spring bar 120 positioned within a region of the rotating hub 15. The spring bar 120 can include a first spring body 121 at a first end of the bar 120 separated from a second spring body 122 at the opposite end of the bar 120 by a spring 123 (see FIG. 12C). The spring bodies 121, 122 are urged by the spring 123 into an extended position when at rest. When the hub 15 is rotated away from the port 55 positions, the opposing bodies 121, 122 get compressed by the central hub 40 of the body 50 into a radially inward position toward one another. When the rotating hub 15 is rotated into alignment with the port 55, the opposing bodies 121, 122 are urged by the spring 123 outward into their resting extended positions so that they are urged into corresponding detent features present within the body.

Figure 12F:
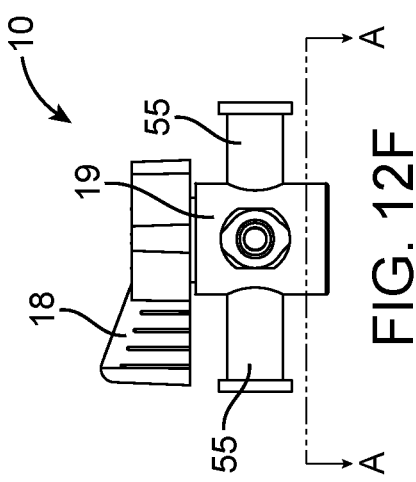
FIG. 12F is a side view of the stopcock of FIG. 12A.
Figure 12G:
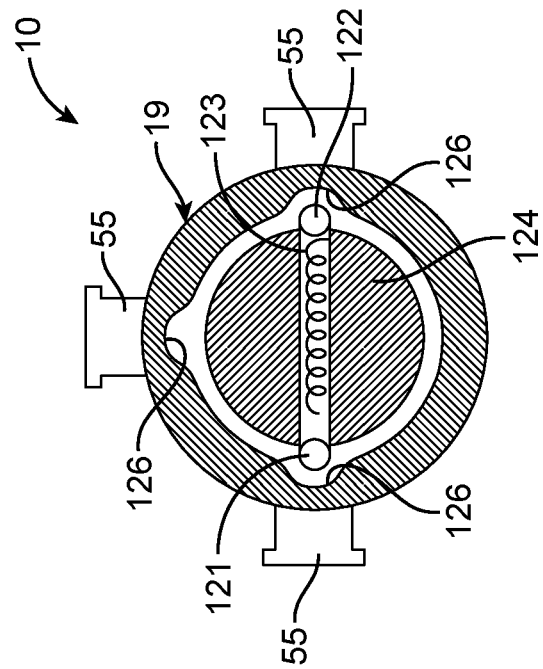
FIG. 12G is a cross-sectional view of the stopcock of FIG. 12F taken along line A-A.
Figure 12E:
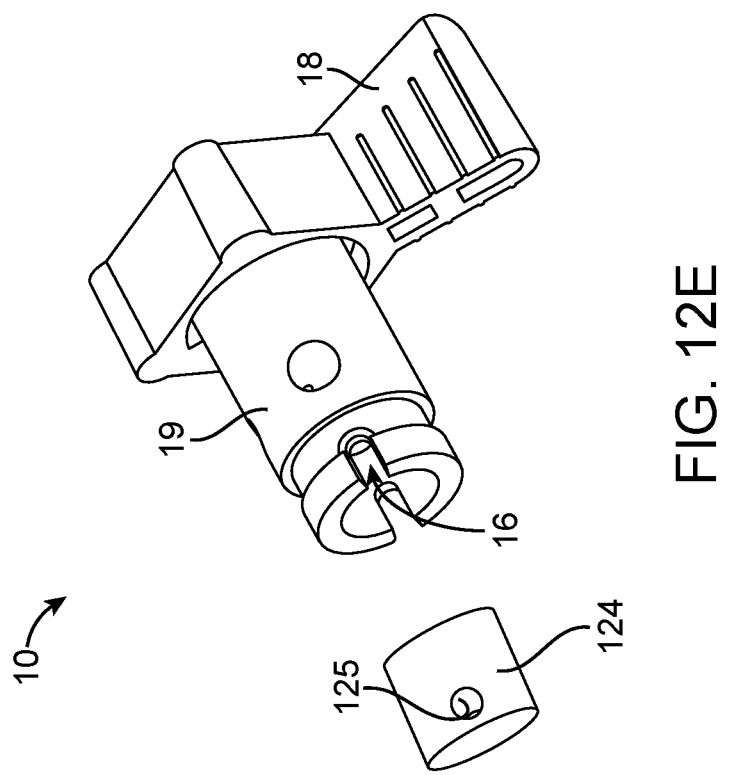
FIG. 12E is a perspective, partially exploded view of the stopcock having an indexing feature incorporating a spring bar.

FIG. 12E is a partially exploded view of the stopcock of FIG. 12A showing a compression spring adaptor 124 sized and shaped to be received within a region of the stopcock, such as the bore 16 extending through the manifold shaft 19, and nested inside the bottom of the arm 18. The spring adaptor 124 can house the double-sided spring bar 120 including the spring 123 and spring bodies 121, 122. The spring adaptor 124 can incorporate apertures 125 sized to receive at least a portion of the spring bodies 121, 122. Where the spring bar 120 includes two spring bodies 121, 122 arranged opposite from one another, the spring adaptor 124 incorporates two apertures 125 extending through walls of the spring adaptor 124 opposite from one another. The spring adaptor 124 is configured to rotate with the arm 18 relative to the shaft 19. FIG. 12G is a cross-sectional view taken along line A-A of FIG. 12F showing the manifold shaft 19, the stopcock arm 18, the compressed spring 123 within the spring adaptor 124, and the bodies 121, 122. As the arm 18 and spring adaptor 124 rotate within the manifold shaft 19, the spring bodies 121, 122, which may be projecting at least partially out their respective apertures 125 in the adaptor 124, are urged inward by the inner wall of the manifold shaft 19. The compression spring 123 is compressed by the spring bodies 121, 122 so that the spring bodies 121, 122 are no long projecting significantly through the apertures 124. The manifold shaft 19 can incorporate one or more pairs of detents 126 on its inner wall that are aligned with a location of the one or more ports 55. The spring 123 urges the spring bodies 121, 122 away from one another so that they extend out the apertures 124 in the adaptor 123 and into the detent pair in the manifold shaft 19 wall indicating a position representative of full flow through the stopcock port 55.

The indexing feature can include two spring bodies urged away from one another into corresponding pair of detents, two spring bodies with just one of the two being urged into a corresponding single detent, or a single spring body that is urged into a single detent aligned with a particular port 55. The spring bodies can have different configurations, such as the t-bars shown in FIG. 12C or roller bearings shown in 12D. The degree of hold once the arm 18 achieves a particular position and the spring bodies engage with the detents can be a function of the spring body shape, compression spring stiffness, and/or whether the detents incorporate lead-ins.

In aspects, description is made with reference to the figures. However, certain aspects may be practiced without one or more of these specific details, or in combination with other known methods and configurations. In the description, numerous specific details are set forth, such as specific configurations, dimensions, and processes, in order to provide a thorough understanding of the implementations. In other instances, well-known processes and manufacturing techniques have not been described in particular detail in order to not unnecessarily obscure the description. Reference throughout this specification to "one embodiment," "an embodiment," "an aspect," "one aspect," "one implementation," "an implementation," or the like, means that a particular feature, structure, configuration, or characteristic described is included in at least one embodiment, aspect, or implementation. Thus, the appearance of the phrase "one embodiment," "an embodiment," "one aspect," "an aspect," "one implementation," "an implementation," or the like, in various placed throughout this specification are not necessarily referring to the same embodiment, aspect, or implementation. Furthermore, the particular features, structures, configurations, or characteristics may be combined in any suitable manner in one or more implementations.

The use of relative terms throughout the description may denote a relative position or direction or orientation and is not intended to be limiting. For example, "distal" may indicate a first direction away from a reference point. Similarly, "proximal" may indicate a location in a second direction opposite to the first direction. Use of the terms "front," "side," "back," "bottom" and "top" as well as "anterior," "posterior," "caudal," "cephalad" and the like or used to establish relative frames of reference, and are not intended to limit the use or orientation of any of the devices described herein in the various implementations.

The word "about" means a range of values including the specified value, which a person of ordinary skill in the art would consider reasonably similar to the specified value. In embodiments, about means within a standard deviation using measurements generally acceptable in the art. In embodiments, about means a range extending to +/−10% of the specified value. In embodiments, about includes the specified value.

While this specification contains many specifics, these should not be construed as limitations on the scope of what is claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results. Only a few examples, embodiments, aspects, and implementations are disclosed. Variations, modifications and enhancements to the described examples and implementations and other implementations may be made based on what is disclosed.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together."

Use of the term "based on," above and in the claims is intended to mean, "based at least in part on," such that an unrecited feature or element is also permissible.

What is claimed is:

1. A medical stopcock comprising:
   a body comprising a central, cylindrical hub surrounding an axis and a plurality of ports extending radially outward from the hub;
   a rotatable hub comprising a housing, a manifold shaft, and an arm, wherein the arm projects from an upper surface of the housing and the manifold shaft extends from a lower surface of the housing, wherein the manifold shaft is sized to be received within the cylindrical hub of the body so as to align coaxially with the cylindrical hub in a rotatable arrangement; and
   an indexing feature comprising at least one spring-loaded element configured to provide engagement with at least a portion of the rotatable hub and an upper surface of at least one of the plurality of ports of the body.

2. The stopcock of claim 1, wherein the engagement provides a tactile and/or audible confirmation of alignment between the portion of the rotatable hub and the upper surface of the at least one port to allow full fluid flow through the at least one port or full closure of the at least one port.

3. The stopcock of claim 1, wherein the spring-loaded element is coupled to the rotatable hub so as to turn around the axis when torque is applied to the arm.

4. The stopcock of claim 3, wherein the spring-loaded element is coupled to the rotatable hub so that movement along the axis relative to the rotatable hub is permitted and rotation around the axis relative to the rotatable hub is prevented.

5. The stopcock of claim 1, wherein the spring-loaded element comprises a lifter plate positioned within at least a region of the housing and at least one spring positioned above the lifter plate.

6. The stopcock of claim 5, wherein a lower surface of the lifter plate has at least one detent.

7. The stopcock of claim 6, wherein the at least one detent comprises a concave shape complementary to a convex shape of the upper surface of the at least one port.

8. The stopcock of claim 6, wherein the lower surface of the lifter plate has a plurality of detents, wherein the plurality of detents are arranged on the lifter plate to match an arrangement of the plurality of ports on the body.

9. The stopcock of claim 8, wherein the plurality of ports comprises at least three ports spaced about 90 degrees from an adjacent port.

10. The stopcock of claim 5, wherein the at least one spring is a wave spring, a wire spring, a leaf spring, a cantilever spring, a coil spring, or a hoop spring.

11. The stopcock of claim 1, wherein the spring-loaded element comprises a ball positioned within a spring housing containing a spring.

12. The stopcock of claim 11, wherein the spring housing is positioned at a location of the at least one port, and wherein the arm has a detent in a lower surface such that the ball is received within the detent when the arm and the upper surface of the at least one port are aligned.

13. The stopcock of claim 11, wherein the spring housing is positioned on the arm and the upper surface of the at least one port comprises a detent such that the ball is received within the detent when the arm and the upper surface of the at least one port are aligned.

\* \* \* \* \*